United States Patent
Shimanckas

[15] 3,669,058
[45] June 13, 1972

[54] NO BACK STEERING FOR AN OUTBOARD MOTOR

[72] Inventor: William J. Shimanckas, Waukegan, Ill.
[73] Assignee: Outboard Marine Corporation, Waukegan, Ill.
[22] Filed: July 17, 1970
[21] Appl. No.: 55,780

[52] U.S. Cl. ............................................115/18 R
[51] Int. Cl. ..........................................B63h 21/26
[58] Field of Search ......................115/18; 192/8 C

[56] References Cited

UNITED STATES PATENTS

| | | | |
|---|---|---|---|
| 2,927,551 | 3/1960 | Bevis et al. | 115/18 |
| 2,947,278 | 8/1960 | Magill et al. | 115/18 |

Primary Examiner—Andrew H. Farrell
Attorney—Robert E. Clemency, John W. Michael, Robert K. Gerling, Gerrit D. Foster, Bayard H. Michael, Paul R. Puerner, Joseph A. Gemignani, Andrew O. Riteris and Spencer B. Michael

[57] ABSTRACT

Disclosed herein is an outboard motor having releasable means in the form of a wrap spring engaged between a king pin and a swivel bracket for preventing relative pivotal movement between the king pin and the swivel bracket. Also disclosed herein are means for releasing the wrap spring including a shaft which is pivotally carried by the king pin co-axially therewith and has means for disengaging locking engagement of the wrap spring between the king pin and the swivel bracket. Also disclosed herein are means connecting and releasing means to the king pin to effect steering movement of the outboard motor after release of the releasable means in response to the application of a steering force to said releasing means.

3 Claims, 4 Drawing Figures

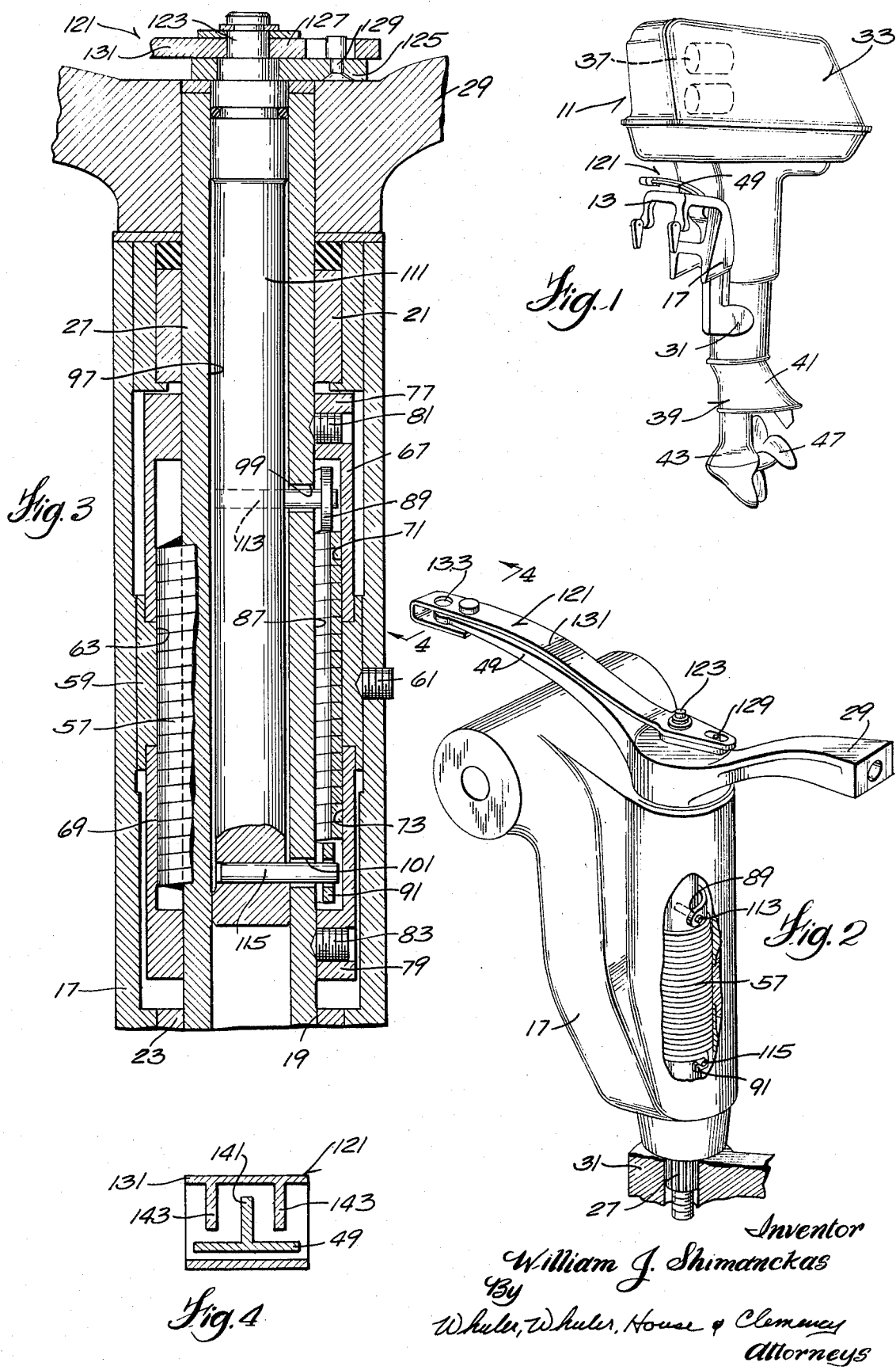

NO BACK STEERING FOR AN OUTBOARD MOTOR

RELATED APPLICATIONS

The application relates generally to the subject matter of my earlier applications Ser. No. 825,716 entitled "No Back Steering" filed May 19, 1969, and Ser. No. 825,834 entitled "Swivel Bracket Lock No Back Steering" filed May 19, 1969.

BACKGROUND OF THE INVENTION

Marine propulsion devices of the type contemplated herein, such as outboard motors and stern drive units, include a propulsion unit supported by a king pin for pivotal steering movement on a swivel bracket supported on the transom of a boat by a stern or clamp bracket. Steering movements are generally imparted to the propulsion unit through a remote steering arrangement which can include a push-pull cable or a steering rope. Such propulsion units are also subject to steering movements or backlash in response to forces originating in the propulsion unit.

My earlier U.S. Pat. No. 3,310,021 discloses one arrangement for locking a propulsion unit against unwanted steering movements. My earlier above-identified applications Ser. Nos. 825,716 and 825,834 also disclose arrangements for preventing unwanted steering movements caused by forces originating with the steerable propulsion unit. Another arrangement for preventing unwanted steering movements by forces originating in the propulsion unit is disclosed in the Irgens et al. application Ser. No. 805,049 filed Mar. 6, 1969 and entitled "Steering Mechanism for a Marine Propulsion Unit."

SUMMARY OF THE INVENTION

The invention provides an arrangement including releasable means engaged between the king pin and the swivel bracket of a marine propulsion device for preventing relative pivotal movement between the king pin and the swivel bracket, together with means for releasing the releasable means, and means connecting the releasing means to the king pin to effect propulsion unit steering movement after release of the releasable means in response to the application of a steering force to the releasing means.

In accordance with the invention, the releasable means comprises a wrap spring which is normally clampingly engaged against an inner segmented cylindrical surface formed integrally with, or on parts fixedly attached to, the king pin and the swivel bracket.

Also in accordance with the invention, the means for releasing the releasable means includes the provision of a shaft located in a bore in the king pin for co-axial pivotal movement relative to the king pin and including means extending through openings in the king pin to engage the ends of the wrap spring to retract the wrap spring from clamping engagement with the swivel bracket in response to pivotal movement of the shaft contained in the bore of the king pin.

Pivotal movement of the shaft is afforded in response to pivotal movement of a releasing bracket pivotally mounted co-axially with the king pin axis and extending into overlying relation to a steering arm extending from the king pin.

Also in accordance with the invention, the means for effecting propulsion unit steering movement after release of the releasable means in response to the application of a steering force to the releasing means includes a pair of spaced ears or tabs on one of the steering arm and the releasing bracket and a projection extending from the other of the steering arm and the releasing bracket and into the space between the tabs in the path of pivotal movement of the ears, whereby there is afforded an initial range of lost relative angular movement between the steering arm and the releasing bracket, followed by interfering engagement of the projection with one of the ears to provide common pivotal movement of the steering arm with the releasing bracket.

One of the principal objects of the invention is the provision of a new and improved arrangement for preventing steering movements of a marine propulsion unit in response to forces originating in the marine propulsion unit.

Another of the principal objects of the invention is the provision of an economical and compact arrangement for releasably locking a propulsion unit against steering movement while, at the same time, affording release of said lock upon the application of a steering force by the operator.

Still another principal object of the invention is the provision of a wrap spring arrangement which is releasably engageable between a king pin and a swivel bracket to releasably prevent pivotal movement therebetween.

Still another object of the invention is the provision of a steering arrangement which prevents self-induced propulsion unit steering movement, and which is economical to manufacture, and which will provide reliable service over a long and useful life.

Other objects and advantages of the invention will become known by reference to the following description and accompanying drawings.

DRAWINGS

FIG. 1 is a perspective view of an outboard motor embodying various of the features of the invention.

FIG. 2 is a partially schematic perspective view, partially broken away and in section, of a portion of the outboard motor shown in FIG. 1.

FIG. 3 is a sectional view of a part of the portion shown in FIG. 2.

FIG. 4 is an enlarged fragmentary sectional view taken along line 4—4 of FIG. 3.

DETAILED DESCRIPTION

Shown in the drawings is an outboard motor 11 which, in accordance with the invention, includes an arrangement for preventing steering action induced by the propulsion unit while permitting steering action in response to the operation of a user, and by a remote steering apparatus, and which is otherwise of conventional construction.

More specifically, the outboard motor 11 shown in FIG. 1 conventionally includes a transom clamp or bracket 13 which is adapted to be connected to the transom of a boat. Connected to the transom bracket 13 about a horizontal axis is a swivel bracket 17 which is accordingly vertically pivotable. The swivel bracket 17 includes a bore 19 which extends perpendicularly to the horizontal axis and supports a pair of spaced bearings 21 and 23 which receive a king pin 27 conventionally connected, adjacent its upper and lower ends by suitable upper and lower brackets 29 and 31 to a propulsion unit 33 (See FIG. 1) carrying a power head 37 and a lower unit 39. The power head 37 includes an engine (not shown) and associated components and the lower unit 39 includes a drive shaft housing 41 which supports the power head 37 and has, at the lower end thereof, a gear box 43 carrying a reversing transmission (not shown) and a propeller 47. Vibration isolating mounts (not shown) can be conventionally interposed between the king pin 27 and the propulsion unit 33. At its upper end, the king pin 27 includes a more or less conventional steering arm 49 which, when pivotally moved to port or starboard, causes pivotal movement of the king pin 27 and connected propulsion unit 33 relative to the swivel bracket 17. As thus far described, the construction is entirely conventional.

In accordance with the invention, there is provided releasable means engaged between the king pin 27 and the swivel bracket 17 for preventing relative pivotal movement between the king pin 27 and the swivel bracket 17 and, thus preventing self-induced steering operation by the propulsion unit 33. Also in accordance with the invention, there is provided means for releasing the releasable means, thereby to afford steering action by a remote steering arrangement (not shown), together with means connecting the release means to the king pin 27 to effect propulsion unit steering movement after release of the releasable means in response to the application of a steering force initiated by the user to the release means.

More particularly in accordance with the invention, the means for preventing relative pivotal movement between the king pin 27 and the swivel bracket 17, comprises formation of the king pin 27 and swivel bracket 17 to provide a segmented, continuous cylindrical surface means, together with a wrap spring 57 which is formed and assembled relative to the cylindrical surface means so as to be normally biased into engagement with the segments of the cylindrical surface means, thereby locking the swivel bracket 17 and king pin 27 against relative pivotal movement.

While various other constructions could be employed, in the disclosed construction, the cylindrical surface means includes a centrally locates sleeve 59 which is suitably fixed, as by a set screw 61 or otherwise, within the bore 19 of the swivel bracket 17. The sleeve 59 has an inner cylindrical surface 63 forming one segment of the cylindrical surface means.

Located above and below the sleeve 59 are respective upper and lower cup-shaped cylindrical members 67 and 69 which are respectively open at the ends adjacent to the sleeve 59, which have respective inner cylindrical surfaces 71 and 73 extending continuously from the sleeve inner surface 63, and constituting segments of the cylindrical surface means, and which have, respective, centrally apertured ends or webs 77 and 79 receiving the main part of the king pin 27. The cup-shaped cylindrical members 67 and 69 are suitably rigidly connected to the king pin 27 as by respective set screws 81 and 83 or other suitable means.

In order to permit radially inward movement of the wrap spring 57 away from engagement with the cylindrical surfaces 63, 71 and 73, the radial distance between the cylindrical surface means and the outer surface 87 (See FIG 3) of the king pin 27 is in excess of the radial depth of the coils of the wrap spring 57.

The wrap spring 57 is located between the outer surface 87 of the king pin 27 and the cylindrical wall means and is biased so that the coils thereof are normally in gripping engagement with each of the cylindrical surfaces 63, 71 and 73. At its ends, the wrap spring 57 includes oppositely bent, respective upper and lower hook portions 89 and 91 which constitute part of the means for releasing the wrap spring 57 from engagement with the swivel bracket sleeve 59 and the king pin cup members 67 and 69 so as to afford pivotal movement of the king pin 27 and accompanying propulsion unit 33 relative to the swivel bracket 17.

Various means can be employed for releasing the releasable means to permit pivotal movement between the swivel bracket 17 and the king pin 27. In the disclosed construction, such means includes formation of the king pin 27 with a central bore 97 co-axial with the pivotal axis of the king pin 27 and with upper and lower radial openings 99 and 101 which are located in the wall of the king pin 27, which communicate with the bore 97, and which are spaced axially at a distance corresponding to the axial spacing between the hooked end portions 89 and 91 of the wrap spring 57.

The release means also includes a releasing shaft 111 which is pivotable in the bore 97 of the king pin 27 and which includes respective upper and lower axially spaced release pins 113 and 115 extending respectively through the openings 99 and 101 into the respective bites of the hooked end portions 89 and 91 of the wrap spring 57. Thus, when the release shaft 111 is pivoted in the clockwise direction as shown in FIG. 2, the upper pin 113 serves to angularly displace the upper end of the wrap spring 57 in the clockwise direction so as to tighten the coils, and release engagement of the wrap spring coils with the upper king pin cup member 67 and with the swivel bracket sleeve 59, thereby permitting relative movement of the king pin 27 and propulsion unit 33 relative to the swivel bracket 17.

When the releasing shaft 111 is pivoted in the other rotative direction, i.e., in the counterclockwise direction as shown in FIG. 2, the lower pin 115 displaces the lower hooked end portion 91 of the wrap spring 57 to provide a similar action relieving the grip of the wrap spring 57 on the swivel bracket sleeve 59 and on the lower king pin cup member 69.

Upon release of the force which pivoted the releasing shaft 111, the wrap spring 57 will promptly expand to again lock the king pin 27 to the swivel bracket 17 and to pivot the releasing shaft 111 back to a normal position accompanying normal grip of the wrap spring 57 with the swivel bracket sleeve 59 and with the king pin cup members 67 and 69.

The releasing shaft 111 extends outwardly at the upper ends of the king pin 27 and is pivotable to release the wrap spring 57 by a releasing bracket or arm 121 which is mounted for free pivotal movement on a reduced diameter end portion 123 of the releasing shaft 111 and about the king pin axis. Pivotal movement of the releasing bracket 121 to pivot the releasing shaft 111 is afforded by means which can take various forms and, in the disclosed construction, comprises a rearwardly extending lever 125 which extends from the projecting upper end of the releasing shaft 111 and which is connected to the rearwardly extending end 127 of the release bracket 121 by a pin 129 located at a radial distance rearwardly of the king pin axis. At its forward end 131, the release bracket includes means including one or more apertures 133 adapted for connection to a remote steering arrangement which can include such components as a push-pull cable or a steering rope. Of course, the releasing bracket 121 can also be adapted for manual operation.

Upon the application of a steering force to the releasing bracket 121, the releasing bracket 121 will pivot about the king pin axis and, in so doing, will angularly displace the lever 125 to move the releasing shaft 111 and the pins 113 and 115 to effect release of the grip of the wrap spring 57 with the swivel bracket sleeve 59.

Also in accordance with the invention, means are provided for connecting the release means to the king pin 27 to effect propulsion unit steering movement after release of the releasable means in response to the application of a steering force to the release means. While various constructions can be employed, in the disclosed construction, the releasing bracket 121 overlies the steering arm 49 and cooperating means are provided on the releasing bracket 121 and on the steering arm 49 to afford a range of limited lost pivotal movement therebetween prior to effecting common pivotal movement. Thus, in the disclosed construction, the steering arm 49 includes a raised projection 141 in the path of pivotal movement and between a pair of spaced ears or tabs 143 which depend from the releasing bracket 121. Thus, in response to the application of an initial steering force, the releasing bracket 121 will initially pivotally move relative to the steering arm 49 and will thereby effect relative pivotal movement of the releasing shaft 111 relative to the king pin 27, whereby to release the wrap spring 57 from the swivel bracket sleeve 59. The continued application of a steering force to the releasing bracket 121, and the accompanying pivotal movement of the releasing bracket 121, will effect engagement between the projection 141 on the steering arm 49 and one of the ears or tabs 143, whereby, thereafter, common pivotal movement of the steering arm 49 with the releasing bracket 121 will occur (the wrap spring 57 being disengaged) to effect pivotal movement of the king pin 27 and connected propulsion unit 33 relative to the swivel bracket 17.

When the steering force applied to the releasing bracket 121 is discontinued, the wrap spring 57 will expand, thereby again locking the king pin 27 to the swivel bracket 17, and will tend to pivot the releasing shaft 111 into a position locating the releasing bracket 121 in centered position above the steering arm 49, so as to afford, in response to the application of a steering force to the releasing bracket 121, an initial amount of lost angular movement therebetween during which the wrap spring 57 is disengaged prior to propulsion unit turning movement.

Various of the features of the invention are set forth in the following claims.

What is claimed is:

1. An outboard motor comprising a swivel bracket having a bore therein, a propulsion unit, a king pin connected to said propulsion unit, and being pivotally received in said bore, and including a steering arm adapted to be pivoted by an applied force to effect common pivoting of said king pin and said propulsion unit relative to said swivel bracket, releasable means for preventing relative pivotal movement between said king pin and said swivel bracket and including an inner cylindrical surface on said swivel bracket and opposed cup members on said king pin having inner cylindrical surfaces extending continuously from said inner surface of said swivel bracket, and a wrap spring biased into engagement with each of said inner cylindrical surfaces on said cup members and on said swivel bracket and including, at the ends thereof, reversely bent hook portions each defining a bite, means for releasing said releasable means including an axial bore in said king pin and a pair of radial openings extending through said king pin and communicating with said bore, a shaft pivotally received in said bore and including an upper end extending beyond said king pin and also including axially spaced pins extending from said shaft and through said openings into engagement with said bites at the ends of said wrap spring for releasing the engagement of said spring with at least one of said swivel bracket and said king pin in response to pivoting of said shaft, a releasing bracket mounted for pivotal movement about said upper end of said shaft and about the pivot axis of said king pin and including means connected between said releasing bracket and said shaft for pivoting said shaft in response to pivoting of said releasing bracket and means adapted for receiving a steering force applied to pivot said releasing bracket, and means including a pair of spaced tabs on one of said steering arm and said releasing bracket and a projection extending between said tabs and in the path of movement of said tabs on the other of said steering arm and releasing bracket for providing a range of limited lost pivotal movement therebetween prior to effecting common pivotal movement, whereby initial pivotal movement of said bracket relative to said steering arm in response to the application of a steering force effects relative pivotal movement between said bracket and said steering arm and relative pivotal movement of said shaft relative to said king pin to effect release of the engagement of said wrap spring with at least one of said king pin and said swivel bracket, and whereby continued pivotal movement of said bracket effects common pivotal movement of said steering arm with said bracket to effect pivotal movement of said propulsion unit relative to said swivel bracket.

2. An outboard motor comprising a swivel bracket having a bore therein, a propulsion unit, a king pin pivotally received in said bore and connected at its upper and lower ends to said propulsion unit for common swinging movement of said propulsion unit and king pin relative to said swivel bracket, a steering arm connected to said king pin and adapted to be pivoted by an applied forece to effect common pivoting of said king pin and said propulsion unit relative to said swivel bracket, an inner cylindrical surface on said swivel bracket, opposed cup members on said king pin having inner cylindrical surfaces extending continuously from said inner surface of said swivel bracket, a single wrap spring biased into engagement with each of said inner cylindrical surfaces on said cup members and on said swivel bracket and including, at the ends thereof, reversely bent hook portions each defining a bite, an axial bore in said king pin, a pair of radial openings extending through said king pin and communicating with said bore, a shaft pivotally received in said bore and including axially spaced pins extending from said shaft and through said openings into engagement with said bites at the ends of said wrap spring for releasing the engagement of said spring with at least one of said swivel bracket and said king pin in response to pivoting of said shaft.

3. An outboard motor comprising a swivel bracket having a bore therein, a propulsion unit, a king pin pivotally received in said bore and connected at its upper and lower ends to said propulsion unit for common swinging movement of said propulsion unit and king pin relative to said swivel bracket, a steering arm connected to said king pin and adapted to be pivoted by an applied force to effect common pivoting of said king pin and said propulsion unit relative to said swivel bracket, releasable means for preventing relative pivotal movement between said king pin and said swivel bracket and including a wrap spring biased into engagement with surfaces on each of said swivel bracket and said king pin, means for releasing said releasable means including an axial bore in said king pin, an opening extending through said king pin and communicating with said bore, a shaft pivotally received in said bore and including an upper end extending beyond said king pin and also including a pin extending from said shaft and through said opening into engagement with said wrap spring for releasing the engagement of said spring with at least one of said swivel bracket and said king pin in response to pivoting of said shaft, a releasing bracket mounted for pivotal movement about said upper end of said shaft and about the pivot axis of said king pin and including means connected between said releasing bracket and said shaft for pivoting said shaft in response to pivoting of said releasing bracket and means adapted for receiving a steering force applied to pivot said releasing bracket, a pair of spaced tabs on one of said steering arm and said releasing bracket and a projection extending between said tabs and in the path of movement of said tabs on the other of said steering arm and releasing bracket for providing a range of limited lost pivotal movement therebetween prior to effecting common pivotal movement, whereby initial pivotal movement of said bracket relative to said steering arm in response to the application of a steering force effects relative pivotal movement between said bracket and said steering arm and relative pivotal movement of said shaft relative to said king pin to effect release of the engagement of said wrap spring with at least one of said king pin and said swivel bracket, and whereby continued pivotal movement of said bracket effects common pivotal movement of said steering arm with said bracket to effect pivotal movement of said propulsion unit relative to said swivel bracket.

\* \* \* \* \*